United States Patent [19]

Smith

[11] 4,002,566
[45] Jan. 11, 1977

[54] WATER PURIFYING SYSTEMS

[76] Inventor: John D. Smith, 5748 King Drive, Chicago, Ill. 60637

[22] Filed: Apr. 7, 1975

[21] Appl. No.: 566,004

[52] U.S. Cl. .......................... 210/169; 210/500 R
[51] Int. Cl.$^2$ .......................................... E04H 3/20
[58] Field of Search .......... 210/169, 150, 248, 198, 210/205, 500

[56] References Cited

UNITED STATES PATENTS

| | | | |
|---|---|---|---|
| 1,756,906 | 4/1930 | Miltetta | 210/500 |
| 1,835,944 | 12/1931 | Hudson | 210/500 X |
| 2,564,926 | 8/1951 | Rapier | 210/500 X |
| 2,809,933 | 10/1957 | Halvorson | 210/205 X |
| 3,295,681 | 1/1967 | Rubert et al. | 210/169 |
| 3,343,677 | 9/1967 | Ohada | 210/205 X |
| 3,578,169 | 5/1971 | White | 210/169 |
| 3,649,532 | 3/1972 | McLean | 210/205 |
| 3,688,907 | 9/1972 | Oravec | 210/169 |

*Primary Examiner*—Theodore A. Granger
*Attorney, Agent, or Firm*—Bernard L. Kleinke

[57] ABSTRACT

A system for purifying water includes flowing the water through a closed path, supporting a bacteria culture in the path of water disposed transversely thereto, and aerating the water in the path upstream of the bacteria culture to enable it to purify the water. In one form of the invention, the water being purified may be flowing through an aquarium for containing fish and/or other aquatic life. In another form of the invention, the water being purified may be flowing through a fish pond or swimming pool.

10 Claims, 3 Drawing Figures

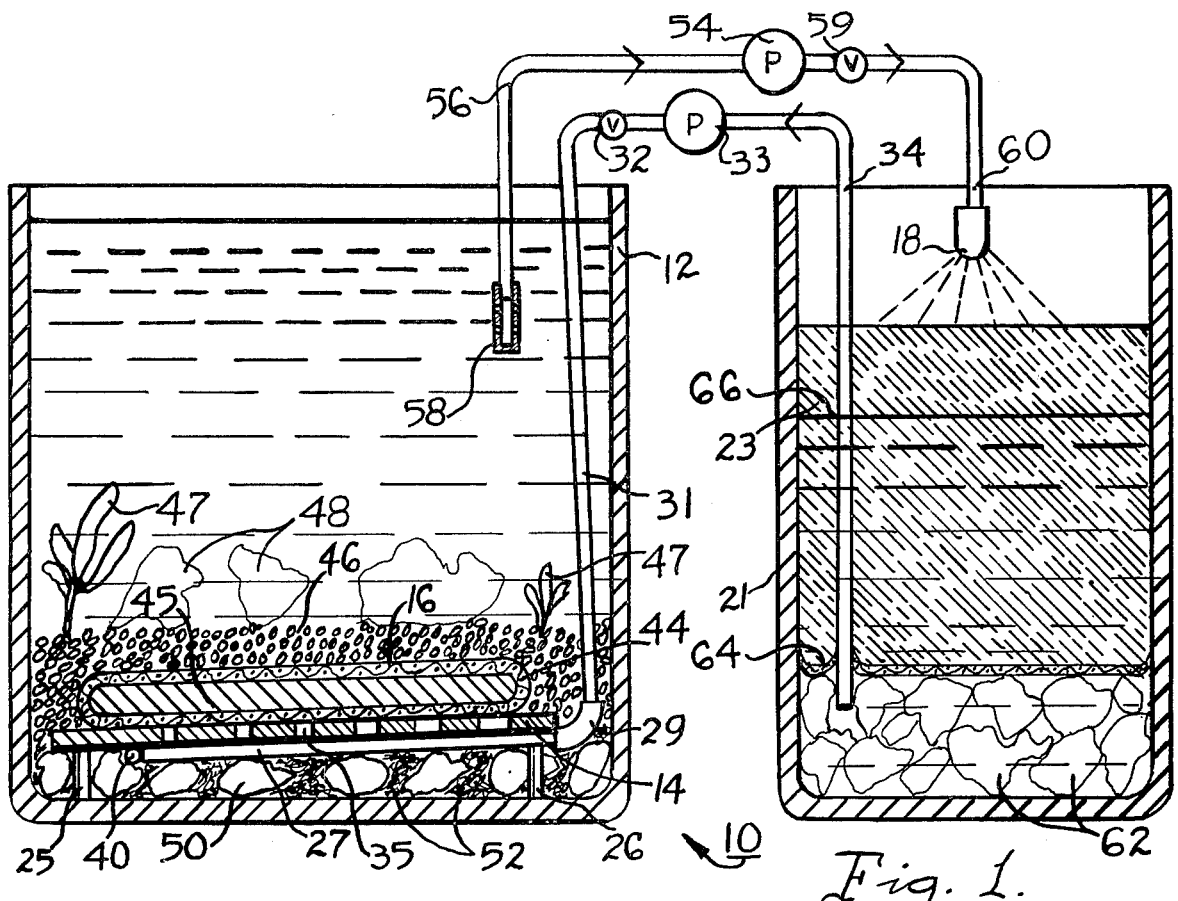
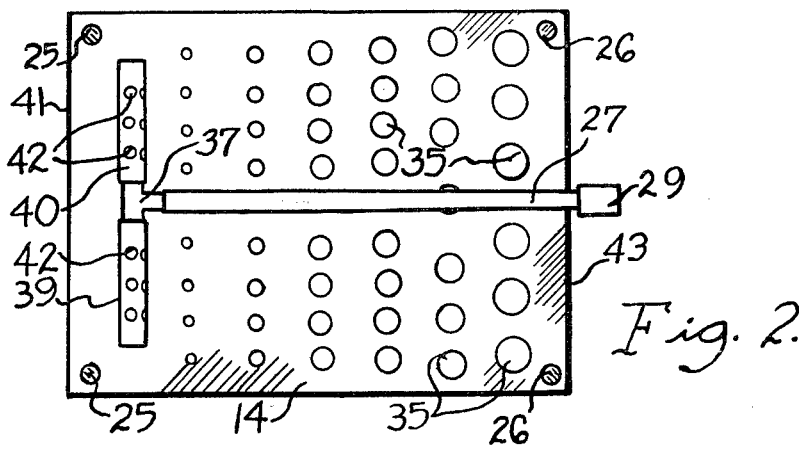
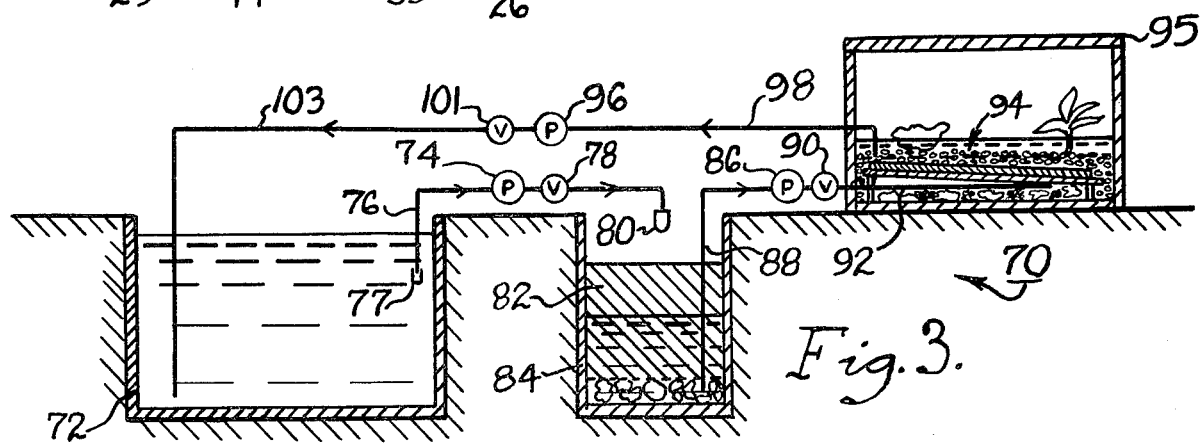

WATER PURIFYING SYSTEMS

The present invention relates in general to water purification systems, and it more particularly relates to water purifying systems including, but not limited to, aquariums, swimming pools and other such systems.

There have been many different types and kinds of water purifying systems, such as filtration systems for aquariums. Many of the water purifying systems, such as aquarium filters, strain the water to remove suspended matter therefrom to provide the water with a clearer appearance. However, after a long period of use of such a system, the water can no longer be purified and becomes cloudy in appearance due to a build up of suspended materials in the water. Therefore, while the prior systems may be entirely satisfactory for some applications, it would be highly desirable to have a new and improved water purifying system which can maintain the clarity of the water in a healthy condition for extremely long periods of time, if not indefinitely, without having to shut down the system to clean it. Such a system should require as little maintenance as possible, and it should be relatively inexpensive to manufacture. Also, unlike prior filter systems, there should be no need for the new and improved system to periodically replace or repair filter elements.

Therefore, the principal object of the present invention is to provide a new and improved water purifying system, which requires little or no cleaning operations.

Another object of the present invention is to provide such a new and improved water purifying system, which is relatively inexpensive to manufacture, and which does not require periodic repair or replacement of filter elements. Briefly, the above and further objects of the present invention are realized by providing a water purifying system, which includes flowing the water through a path, supporting a bacteria culture in the path of water disposed transversely thereto, and aerating the water in the path upstream of the bacteria culture. The bacteria culture constantly and continuously cleans and purifies the water. In one form of the invention, the water flows through an aquarium supporting fish and other aquatic life, and in another form of the invention the water flows through a container which may serve as a fish pond, swimming pool or other useful applications.

The above and still further highly important objects and advantages of the invention will become apparent from the following detailed specification, appended claims and attached drawings, wherein:

FIG. 1 is a schematic diagram of a water purifying system, which is constructed in accordance with the present invention;

FIG. 2 is a bottom plan view of a plate used in the system of FIG. 1; and

FIG. 3 is a schematic diagram of another water purifying system, which is also constructed in accordance with the present invention.

Referring now to the drawings, and more particularly to FIGS. 1 and 2 thereof, there is shown a water purifying system 10 for an aquarium 12, the system 10 being constructed in accordance with the present invention. The aquarium 12 is adapted to contain fish and other aquatic life, it being understood that the system 10 may also be used for other applications as will become apparent during the following description. The system 10 generally comprises a perforated plate 14 for supporting a bed 16 for establishing and maintaining a bacteria culture which cleans the water in the aquarium 12 flowing therethrough, and an aerating device in the form of a nozzle 18 for spraying water from the aquarium 12 into a container 21 confining a coarse filter media 23 for aerating and filtering the water from the aquarium 12, the aerated and filtered water being recirculated to the aquarium 12 under the plate 14 to provide a closed loop path of travel of the water being constantly and continuously purified. The aeration of the water by means of the nozzle 18 causes bacteria to proliferate and colonize in the bacteria culture bed 16. The bed 16 is of the same size as the cross-sectional area of the inside of the aquarium 12 so that substantially all of the water passes through the bacteria culture disposed within the bed 16 continuously for purifying the water. The bed 16 provides a site for microorganisms in the water to colonize and to be nourished by the energy-yielding substances in the putrescible matter, such as waste products produced by the fish, uneaten food and the like, constantly being introduced in the aquarium 12. The process taking place in the bacteria culture bed 16 forms a gelatinous zoogloeal film to provide a biological flocculation and precipitation for the biological destruction of all putrescible matter in the water coming into contact with the film surfaces.

Considering now the plate 14 in greater detail, the perforated plate 14 includes a pair of shorter front legs 25 and a pair of longer rear legs 26 to enable the flat perforated plate 14 to be inclined forwardly as indicated in FIG. 1 of the drawings. A discharge tube 27 extends under the central portion of the plate 14 and is connected at its rear end through an elbow 29 to a discharge tube 31 connected through a regulating valve 32 to a pump 33 which has a suction tube 34 for drawing water from the container 21. A series of holes 35 extend through the plate 14 to facilitate water to pass upwardly therethrough. A tee connector 37 is connected to the exit end of the discharge tube 27 and has a pair of perforated radial tubes 39 and 40 connected in fluid communication therewith to distribute the water from the discharge tube 27 at the forward end of the plate 14, the radial tubes 39 and 40 extending in alignment with one another in a parallel relationship with the front edge 41 (FIG. 2). The distal end portions of the radial tubes 39 and 40 are closed, and a plurality of holes, such as the holes 42 in the radial tube 39, are distributed about the radial tubes to enable the water flowing therefrom to be evenly distributed therefrom. The discharge tube 27, the tee connector 37 and the radial tubes 39 and 40 are each connected to the underside of the plate 14 by any suitable technique such as by a suitable adhesive. The holes in the radial tubes 39 and 40 are arranged on all sides thereof except the portions thereof attached to the plate 14. In accordance with the present invention, by mounting the plate 14 in an inclined manner and having the exit end portion of discharge tube 27 disposed at the lower end of the plate 14, the aerated water flowing from the radial tubes 39 and 40 are forced upwardly back along the plate 14 to be evenly distributed thereover. The holes 35 are graduated in size and are progressively larger in size from the front edge 41 toward the rear edge 43 (FIG. 2) so that a small portion of the water flowing from the radial tubes 39 and 40 are released through the relatively smaller holes closer to the front edge 41 and so that more and more water is released through the holes 35 as the water flows rearwardly. Therefore, by mounting the plate 14 in an inclined manner and providing progressively larger size holes from front to rear of the plate 14, there is no need to provide unwanted and expensive series of extra radial perforated tubes to provide for an even distribution of the water flowing under and through the plate 14. It should be understood that the same even distribution may be achieved by having the perforated plate slope downwardly rearwardly and having the pair of radial tubes mounted closely adjacent to the rear edge 43 of the plate 14 for enabling the water to flow upwardly along the underside of the plate with the holes in the plate becoming progressively larger from rear to front. The arrangement as shown in FIGS. 1 and 2 of the drawings is preferred since trapped air bubbles rise from the higher edge of the plate since the larger holes are disposed at that location, and it is desirable to have these air bubbles rising in the aquarium 12 at the rear portion thereof so that an observer looking into the front of the aquarium 12 will not have his view of the aquatic life therein obstructed by occasional rising air bubbles.

Considering now the bed 16 for establishing and maintaining a bacteria culture, the bed 16 includes a porous closed bag 44 containing bacteria forming and holding material 45. The material 45 in the porous bag 44 comprises a mixture of long fiberous sphagnum moss, diatamous powder, gravel, clay and bone meal. There is approximately two parts of sphagnum moss, approximately one-half to one part of diatamous powder, approximately two parts of gravel, approximately one-half part of clay, and approximately one-half part of bone meal. All of these materials are natural products, and are relatively inexpensive. The ingredients of the mixture are mixed to provide a relatively thick paste-like substance to cling to the sphagnum moss, which clinging is necessary to prevent the moss from escaping and entering into suspension in the water. The materials are mixed and then dried before inserting them into the porous bag. The sphagnum moss is soaked in water before mixing it with the other materials to drive off excess humus. The porous bag 44 is composed of any suitable porous material which resists rotting, and one such material is a wedding veil nylon mesh material.

The sphagnum moss is an acid material to help provide a balanced pH, since it is higly desirable to have the water maintained at either a neutral or an acidic condition. The moss also supplies humus to provide a soil-like condition for the water to make it conducive to supporting plant life and bacterial life. The moss also promotes spawning of fish when fish are part of the aquatic life. The moss remains in a bog-like mixture to remain for a long period of time without being carried into suspension in the water.

The diatamous powder provides a site to promote and hold bacteria and it provides some filtration. It is made of skeletons of plancton. A less desirable substitute for the diatamous powder is a charcoal mesh which is eventually consumed and must be replaced.

The gravel is a natural gravel and provides some filtration. It prevents compacting of the mixture within the bag 44, and it thus permits the water to flow freely through the mixture is an evenly distributed manner so that the water can come in contact with the bacteria culture supporting media within the bag 44.

The clay contains bacteria and minerals which facilitate the establishment and maintenance of a desirable bacteria culture for cleaning the water in the system. The clay promotes the growth of the bacteria and contributes to the permanent supply of humus to the system. The clay also helps to form the paste to provide a body for the other ingredients of the mixture.

The bone meal provides an acid balance for the pH of the system. Normally, most drinking water is alkaline, and therefore it is highly desirable to have naturally occurring acidic materials within the system. The bone meal also provides health building minerals for the aquatic life in the system, including the bacteria culture. These minerals include calcium, magnesium and others. Such minerals are essential to a healthy aquatic life, and in this regard, for example, fish absorb the calcium for bone building. The minerals are also desirable for good plant life.

Of the five ingredients of the mixture within the porous bag 34, all are essential except the clay and bone meal which are added to take advantage of their properties.

Natural gravel 46 covers and conceals the bag 44 in the aquarium 12 to hold the bag down, and it provides for some filtration of the water. Also, the gravel 46 provides water disbursion as it flows upwardly from the bag 44. The gravel 46 also serves a decorative purpose and it holds the live plants 47 in position in a conventional manner. Natural decorative rocks 48 rest on top of the gravel 46 for decorative purposes. The rocks 48 and the gravel 46 may be composed of natural acidic material for balancing the pH of the system. Such rocks as granite may be employed for that purpose. Rocks 50 under the plate 14 help distribute the water under the plate and quiets the motion thereof. Long fiber sphagnum moss 52 mixed in with the rocks 50 under the plate 14 serves also to distribute the water and quiet the turbulence thereof. The rocks 50 are also preferably acidic in nature when the water being purified is alkaline. It should be understood by those skilled in the art that should the water being purified be acidic, the moss 52 under the plate 14 would not be employed and all of the rocks and gravel in the system would be of the opposite alkaline variety for balancing the pH of the system. By balancing the pH of the system with naturally occurring substances such as rocks,, gravel and moss, the pH balance of the water is maintained indefinitely without the necessity of adding chemicals to the water, which chemicals are ordinarily consumed and thus need to be replenished periodically.

A pump 54 having a suction tube 56 draws water from the aquarium 12 through a strainer tube 58 to the container 21 through a regulating valve 59 and a discharge tube 60 to the nozzle 18. By providing the bed 16 at the bottom portion of the aquarium 12, the water is drawn upwardly out of the aquarium so that water is constantly and continuously flowing from under the plate 14 upwardly through the bed 16 and out of the tube 56. As a result of the upward movement of the water within the aquarium 12, trapped gases at the bottom of the aquarium 12 are carried upwardly and released to the atmosphere for the purpose of driving off undesirable gases to eliminate any build up of such gases. Such undesirable gases include ammonia, nitrate, nitrite, nitrogen, hydrogen and the like which naturally occur in the water. For example, ammonia gas is derived from waste products of fish and uneaten food.

The means in the form of the nozzle 18 for aerating the water breaks up the water by spraying it into the opentopped container 21 to form droplets in a similar manner as rain drops for aeration purposes. By aerating the water, undesirable gases such as chlorine, are released from the water. The aeration of the water in this manner adds large quantities of oxygen from the atmosphere to the water which serves to sustain the bacteria culture in the bed 16 and provides oxygen for the other aquatic life in the aquarium 12. The nozzle 18 is pointed downwardly and sprays a pattern of water into the open mouth of the container 21 into the filter media 23. If desired, the nozzle 18 may be directed upwardly against an auxiliary inverted open-mouth container (not shown) to obtain a greater disbursion of the water as it drops from the auxiliary container back downwardly under the force of gravity into the filter media 23. It should also be understood by those skilled in the art that there are many different ways in which the water may be disbursed and sprayed into contact with the air for aeration purposes.

Natural rocks 64 are disposed on the bottom wall of the container 21 to enable water to be drawn by the pump 33 through the suction tube 34, which has its entrance end disposed among the rocks 62. A porous sheet 64 rests on top of the layer of rocks 62 and has a snug fitting opening through which the suction tube 34 extends to separate the filter media from the layer of rocks 62, whereby the water can be readily drawn from the bottom of the container 21 after passing through the coarse filter media 23. The porous sheet 64 prevents any of the coarse filter media from clogging the entrance end of the suction tube 34. The layer of rocks 62 occupy approximately one-fourth of the contents of the container 23.

The coarse filter media 23 includes a mixture of sand, gravel, long fiber sphagnum moss and hard coal. The filter media 23 includes approximately one part of natural gravel, approximately one part of natural sand, approximately one-half to two parts of sphagnum moss, and at least one-fourth ounce of bituminous coal, the rocks 62 serving to add a layer of filtration for the coarse media 23 and thus may be considered as being a part of the media 23. It should be understood by those skilled in the art that the sand and gravel need not be mixed, but instead a layer of sand may be positioned on top of a layer of gravel which in turn rests on the porous sheet 64. The coal would then be disbursed throughout the gravel and among the rocks. When the water being purified is alkaline, the rocks and gravel may be acid, such as granite, The porous sheet 64 may be similar to the material of the porous bag 44 in that the porous material 64 should be composed of suitable material which does not tend to rot, such material as polyester being suitable. The porous sheet 64 may have a finer mesh than the material of the bag 44 since the sheet 64 is disposed toward the bottom of a relatively large head of water, whereas the pump 33 must force the water through the porous bag 44 without the aid of a head of water as found in the container 21.

The sphagnum moss of the filter media 23 reduces the alkalinity of the water where the water is alkaline in nature, it being understood that where the water being processed is acidic, the moss is not used. The moss in the filter media 23 serves the same purpose as the moss used in the aquarium 12. The moss of the filter media 23 also serves to keep the sand and gravel from compacting.

The sand and gravel filter out larger particles which are not conveniently disposed of by the bacteria in the bed 16. In this regard, larger particles are carried into the filter media 23 which retains them in the container 21 so that they are removed from the aquarium 12 and can be conveniently disposed of by the bacteria in the water while they are in the container 21, the bacteria being distributed throughout the water in the system. The coal in the filter media 23 provides minerals and natural oil for the same reason that coal is found naturally in the earth to help purify water for lakes and streams.

Plants (not shown) may be rooted in the container 21 and serve the same purpose as the plants 47 in the aquarium 12 to absorb harmful gases and other chemicals, such as nitrogen, nitrates, ammonium sulfate, hydrogen and the like by the roots of the plants.

Potassium may be added to the water in the system 10 to associate other minerals to break them down whereby minerals become effective and can be readily assimilated into the system. Such minerals include phosphorous, chlorine, sodium, iron, magnesium, calcium, sulfur, fluorine and other elements. Thus, the potassium helps prevent deposits on the walls of the aquarium 12 and the walls of the container 21. The potassium also helps promote all organic life in the system 10. Although the potassium is not necessary to the successful operation of the system 10, it greatly facilitates its operation. Only small quantities should be added periodically, since adding too much promotes rapid and unnatural growth within the system. It has been discovered that apple cider vinegar and kelp contain the necessary potassium and are naturally occurring substances which can be conveniently added to the system 10 at periodic intervals.

The nozzle 18 is mounted in the preferred form of the invention about four inches above the level of the filter media 23, and the level of water in the container 23 is advantageously at a position 66 spaced a substantial distance from the upper surface of the filter media 23 so that the water spraying into the filter media 23 mixes with air in the filter media 23 above the water level in the container 21. The valves 32 and 59 may be regulated to achieve the proper and desired levels in the aquarium 12 and the container 21. By maintaining such levels, trapped air bubbles are drawn by the pump 33 from the container 21 and discharged under the plate 14 within the aquarium 12 so that random periodic air bubbles are released within the aquarium 12. These air bubbles further provide aeration for the water within the aquarium 12, and the bubbles themselves serve to carry undesirable gases from the lower portion of the aquarium water to release them to the atmosphere. Thus, the valves 32 and 59 are adjusted so that both air and water are drawn through the filter media 23 and out of the container 21 to further facilitate the aeration of the water by the nozzle 18.

The volume of the coarse filter media 23 may be about one-fourth the volume of the water contained in the aquarium 12. The bed 16 has a horizontal cross-sectional area only slightly smaller than the cross-sectional area of the inside of the aquarium 12, and thus the bed 16 is adapted to fit into a given size aquarium. With the bed 16 and the entire system 10, the good bacteria, such as heterotrophic and autotrophs in the water utilize nitrogenous compounds by converting them to ammonia. Nitro somonas bacteria in the water oxidizes ammonia to convert it to nitrite, and nitro bacter bacteria oxidizes the nitrites to nitrates. Thus, the bacteria within the bed 16 and also distributed throughout the water flowing within a closed loop in the system 10 provides a self cleaning operation. The only maintenance necessary is to add water, even chlorinated tap water, to the system periodically to replace water lost by evaporation. It may also be desirable periodically, such as once a year, to shut down the system, and disconnect the tube 34 from the pump 33 so that water, such as tap water, may be forced under pressure into the suction tube 34 for backwashing the coarse filter media 23 in the container 23. Such a backwashing operation may not be needed for some systems, and such backwashing operation is either eliminated or greatly reduced where many natural growing plants are rooted in the filter media 23.

All of the parts of the system 10 are naturally occurring substances, except the plastic parts of the pumps and tubing, which plastic parts should be non-toxic. With the system of the present invention, the water may be maintained at higher temperatures than conventional aquarium systems since the system of the present invention provides for greater quantities of dissolved oxygen in the water. While pumps may be used which are cooled by the water flowing through them, and thus heat is introduced into the water, it is preferred to have air cooled pumps, such as a pump designated as Model No. 1AA-OM which may be purchased at Little Giant Pump Company, 3810 North Tulsa Street, Oklahoma City, Oklahoma 73312. In order to facilitate the operation of the system 10, a conventional aquarium water wheel (not shown) may be connected in fluid communication with the discharge tube 31 and disposed within the aquarium 12 resting on top of the gravel 46 to generate additional air bubbles for rising through the water in the aquarium to break up the surface tension at the upper surface of the water in the aquarium to facilitate the release of the undesirable gases from the water in the aquarium.

Referring now to FIG. 3 of the drawings, there is shown a system 70 which is also constructed in accordance with the present invention, and which is similar to the system 10 of FIGS. 1 and 2 of the drawings, except that the system 70 is adapted to be incorporated in a fish pond, swimming pool or other such application. The system 70 includes a container 72 submerged in the ground for use as a fish pond or swimming pool. It should be understood that the system 70 may also be used for in-door applications as well. A pump 74 draws water from the container 72 through a suction line 76 having a strainer tube 77 at the entrance end thereof and pumps the water through a regulating valve 78 to means, such as the nozzle 80, for aerating the water flowing therethrough in the form of a spray pattern into a coarse filter media 82 disposed within an in-ground container 84. The filter media 82 and the container 84 are similar to the container 21 and the filter media 23 of FIG. 1.

A pump 86 draws water from the bottom portion of the container 84 via a suction line 88 to pump the water through a regulating valve 90 to a discharge line 92 disposed beneath a bacteria bed generally indicated at 94 within a watertight container 95. The bacteria culture bed 94 is similar to the bed 16 of FIG. 1 and the other materials, such as gravel, rocks, plants and the like disposed in the bottom of the aquarium 12 are also used in the container 95, which is disposed above ground. The bed 94 is supported in the same manner as the bed 16 of the system 10 shown in FIG. 1. The container 95 is preferably formed of transparent material and is a structure similar in design to a green house. Also, the container 95 should be provided with means for ventilating the interior of the container 95, such means as openings or windows disposed near the upper portion thereof. However, the bottom portion of the container 95 is watertight so that water can partially fill the container 95 as indicated in FIG. 3. As a result, fish may also be present in the water in the container 95.

A pump 96 draws water from the container 95 via a suction line 98 and pumps it through a regulating valve 101 and a discharge tube emptying into the container 72 to complete a closed-loop path of travel of the water in the system 70, the exit end of the discharge tube 107 being disposed near the bottom of the container 72. The operation of the system 70 is similar to the operation of the system 10, the container 95 and the contents thereof being similar to the aquarium 12 of FIG. 1, the only difference being the addition of the container 72 not having a bacteria culture bed disposed therein. However, while for some applications the container 72 does not need a bacteria culture bed disposed therein, another bacteria culture bed (not shown) may also be employed in the container 72 at the bottom thereof in a similar manner as the bed 94 in the container 95 to provide additional cleaning capabilities.

Both the system 10 of FIG. 1 and the system 70 of FIG. 3 are designed to be used with fresh water, systems employing the principles of the present invention in salt water embodiments may require different forms of bacteria for cleaning purposes.

While the present invention has been described in connection with particular embodiments thereof, it will be understood that many changes and modifications of this invention may be made by those skilled in the art without departing from the true spirit and scope thereof. For example, the aquarium system 10 of FIG. 1 may be modified by eliminating the pump 33 and mounting the filter container 21 in an elevated position relative to the aquarium 12 so that water is fed from the bottom of the container 23 under the force of gravity back to the aquarium 12. Accordingly, the appended claims are intended to cover all such changes and modifications as fall within the true spirit and scope of the present invention.

What is claimed is:

1. A system for purifying water, said system comprising: a container; a perforated member within said container and spaced above the bottom thereof and extending substantially over the entire area thereof, pump means for moving water between an upper portion of said container above said member and the bottom of said container below said member to recirculate the water, means located in the path of travel of the water for aerating it; and a bacteria culture bed composed of approximately two parts sphagnum moss and approximately three and one-half parts of a mixture of gravel, diatomaceous powder, clay and bone meal; said bed being disposed above and supported by said member.

2. A system according to claim 1, wherein said mixture comprises approximately one-half to one part of diatamous powder, approximately one-half part of clay and approximately one-half part of bone meal.

3. A system according to claim 2, wherein said mixture comprises one-half part of diatamous powder.

4. A system according to claim 1, further including flexible mesh material disposed in overlying relationship on said perforated member.

5. A system according to claim 1, further including means defining a chamber in said path, said bed for establishing and maintaining a bacteria culture being disposed outside of said chamber.

6. A system according to claim 1, wherein said path is a closed loop path for recirculating the water.

7. A system according to claim 6, further including means containing a coarse filter media in said path for filtration purposes.

8. A system according to claim 1, further including means for supporting the bacteria culture bed, the last-mentioned means including a perforated plate and means for mounting the plate in an inclined manner.

9. A system according to claim 1, wherein said bed for establishing and maintaining a bacterial culture includes approximately two parts sphagnum moss, approximately one-half to one part of diatamous powder, approximately two parts of gravel, approximately one-half part of clay and approximately one-half part bone meal, further including means containing a coarse filter media in said path for filtration purposes, said coarse filter media including approximately one part of gravel, approximately one part of sand, approximately one-half to two parts of sphagnum moss, rocks and at least one-fourth ounce of coal.

10. A system according to claim 1, wherein said means for moving water comprises a water pump, said container including a wedding veil nylon mesh material spaced above said perforated member for at least partially confining said bacterial culture bed.

* * * * *